United States Patent
Chaney et al.

(10) Patent No.: US 7,127,587 B2
(45) Date of Patent: Oct. 24, 2006

(54) INTENT SEIZES IN A MULTI-PROCESSOR ENVIRONMENT

(75) Inventors: Gregory Alan Chaney, Mantorville, MN (US); Robert Anthony Petrillo, Lanesboro, MN (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 10/733,958

(22) Filed: Dec. 11, 2003

(65) Prior Publication Data

US 2005/0132143 A1    Jun. 16, 2005

(51) Int. Cl.
*G06F 12/08* (2006.01)
(52) U.S. Cl. .................... 711/216; 711/145; 711/163
(58) Field of Classification Search ........ 711/108–170; 710/18, 36; 718/104; 714/15
See application file for complete search history.

(56) References Cited

U.S. PATENT DOCUMENTS

| | | | | |
|---|---|---|---|---|
| 5,161,227 A | * | 11/1992 | Dias et al. ................. | 718/104 |
| 5,230,070 A | * | 7/1993 | Liu ............................. | 711/145 |
| 5,530,958 A | * | 6/1996 | Agarwal et al. ............... | 711/3 |
| 5,590,326 A | * | 12/1996 | Manabe ...................... | 711/150 |
| 5,613,139 A | * | 3/1997 | Brady ......................... | 710/200 |
| 5,893,157 A | * | 4/1999 | Greenspan et al. ......... | 711/150 |
| 6,578,131 B1 | * | 6/2003 | Larson et al. ............... | 711/216 |
| 2003/0084057 A1 | * | 5/2003 | Balogh ....................... | 707/100 |

* cited by examiner

*Primary Examiner*—Reginald G. Bragdon
*Assistant Examiner*—Thanh D. Vo
(74) *Attorney, Agent, or Firm*—Owen J. Gamon (57) ABSTRACT

A method, apparatus, system, and signal-bearing medium that in an embodiment use a requested address for an intent seize and a processor associated with the intent seize to determine a hash table entry. If the requested address is not found in the hash table, all hash tables for all processors are updated to anchor to the requested address. Non-intent seizes use a hash table associated with a designated processor, regardless of whether the designated processor initiated the non-intent seize. In this way, in an embodiment modified, cache line interventions may eliminated for intent seizes.

16 Claims, 6 Drawing Sheets

INTENT SEIZES IN A MULTI-PROCESSOR ENVIRONMENT

FIELD

An embodiment of the invention generally relates to computers. In particular, an embodiment of the invention generally relates to a task synchronization mechanism.

BACKGROUND

Computer technology continues to advance at a rapid pace, with significant developments being made in both software and in the underlying hardware upon which the software executes. One significant advance in computer technology is the development of multi-processor computers, where multiple computer processors are interfaced with one another to permit multiple operations to be performed concurrently, thus improving the overall performance of such computers.

In a multi-processor system, there is typically one or more locks that allow the multiple processors to communicate with each other and to ensure that certain limited system resources are available to each processor when required. Such locks typically reside in a memory that is globally accessible to all processors in the system and indicate whether a resource on the computer system is available to a particular processor.

Each processor in a multi-processor system typically includes its own instruction cache to speed the execution of code and data accesses to memory. When a processor needs to access a resource (e.g., a memory location at a certain address) that has access protected by a lock in globally-accessible memory, the processor must read the lock to determine whether the resource is available. In performing this read, the lock is typically read into the processor's cache. If the resource is available to the processor, the processor typically updates the lock to indicate that the processor has the resource. Because the lock is now residing in the processor's cache, this update is to the copy of the lock in the processor's cache. A cache manager detects that the lock in the processor's cache has been updated and invalidates any other copies of the lock in other processors' caches. The cache manager then writes the updated lock from the processor's cache to main memory. The next time a different processor needs to access the lock, it must load the lock from memory into its cache because its cached coy of the lock has been invalidated due to the change by a different processor.

For locks that are seldom accessed, the invalidation of cached copies of the lock in the caches of other processors provides little performance penalty. But, there are some locks that are accessed very frequently. One example of a frequently-accessed lock is in a system-wide serialization table called a seize table, which may be accessed by all tasks executing on all processors in the system. The seize table controls the locking of memory addresses that may be accessed by multiple processors.

Seize tables typically include a single hash table that anchors hash synonyms, which are addresses that hash to the same location. Each address anchor points to a set of data structures used to represent all holds on that particular memory address at a given time. Certain hold types are highly concurrent, i.e., many tasks may have a weak hold type on a particular memory address at the same time. Unfortunately, as the concurrency increases, so does the frequency of modified cache lines because all of the holds are represented in a single instance of system global storage. Modified cache line interventions are very costly events, which adversely impact performance of the system.

Without a way to provide a synchronization mechanism that does not cause significant performance penalties when a shared resource is accessed frequently, the computer industry will continue to suffer from degraded performance when using locks as synchronization mechanisms.

SUMMARY

A method, apparatus, system, and signal-bearing medium are provided that in an embodiment use a requested address for an intent seize and a processor associated with the intent seize to determine a hash table entry. If the requested address is not found in the hash table, all hash tables for all processors are updated to anchor to the requested address. Non-intent seizes use a hash table associated with a designated processor, regardless of whether the designated processor initiated the non-intent seize. In this way, in an embodiment modified, cache line interventions may eliminated for intent seizes.

DETAILED DESCRIPTION

Figure 1:
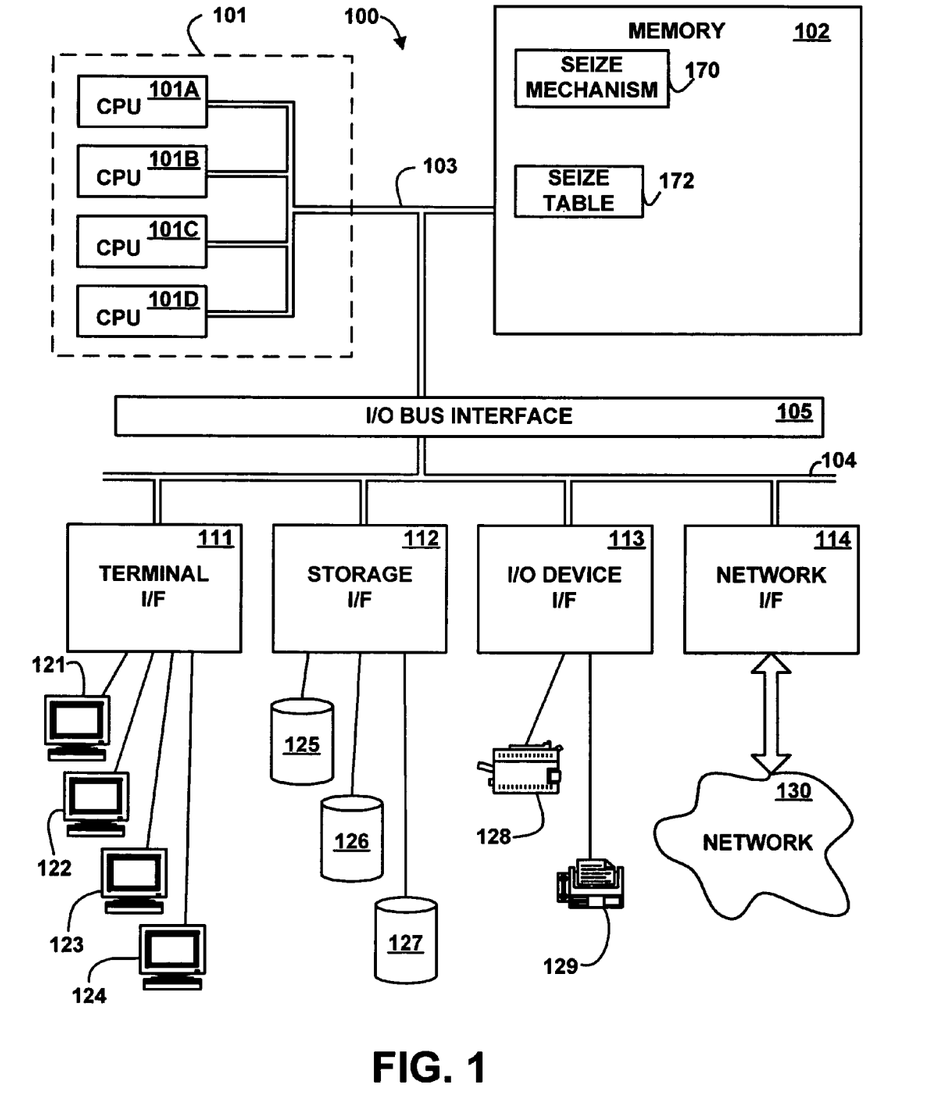
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. E.g., memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a seize mechanism 170 and a seize table 172. Although the seize mechanism 170 and the seize table 172 are illustrated as being contained within the memory 102 in the computer system 100, in other embodiments either or both may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the seize mechanism 170 and the seize table 172 are illustrated as residing in the memory 102, these elements are not necessarily all completely contained in the same storage device at the same time.

In an embodiment, the seize mechanism 170 includes instructions capable of executing on the CPUs 101 or statements capable of being interpreted by instructions executing on the CPUs 101 to perform the functions as further described below with reference to FIGS. 3, 4, and 5. In another embodiment, the seize mechanism 170 may be implemented in microcode. In another embodiment, the seize mechanism 170 may be implemented in hardware via logic gates and/or other appropriate hardware techniques.

The seize mechanism 170 handles both intent and non-intent seizes using the seize table 172. Intent seizes are a set of seizes that obtain less restrictive seizes, holds, or locks on memory than do non-intent seizes. Because intent seizes are less restrictive than non-intent seizes, they are often used in high-concurrency operations in a multi-tasking environment. The following conflict table illustrates the interaction of intent and non-intent seizes:

| Seize Type | EXC | SHR | INX | INS | IIX | FA |
|---|---|---|---|---|---|---|
| EXC | C | C | C | C | C | C |
| SHR | C | A | C | A | A | C |
| INX | C | C | A | A | A | C |
| INS | C | A | A | A | A | C |
| IIX | C | A | A | A | A | A |
| FA | C | C | C | C | A | C |
| DX | C | C | C | C | C | C |

Legend:
EXC: Exclusive seize.
SHR: Shared seize.
INX: Intent exclusive seize.
INS: Intent shared seize.
IIX: Internal Intent Exclusive seize.
FA: Flush all seize.
C: Conflict. These two types of seizes are incompatible with one other, unless they are held by the same task. That is, if one task has a seize of one type on a memory location, the other task may not obtain a seize of the other type on the same memory location.
A: Allowed. These two types of seizes are compatible. That is, one task can obtain one of the types of seizes at the same time that another task has a seize of the other type of seize on the same memory location.

Thus, INX, INS, and IIX are the intent seizes, and all others are non-intent seizes.

The seize table 172 is an example of a system-wide serialization table, which may be accessed by all tasks executing on all of the processors 101 in the computer system 100. Although the seize table 172 is illustrated in FIG. 1, in other embodiments any type of system-wide serialization table may be used. The seize table 172 is further described below with reference to FIG. 2A.

The memory bus 103 provides a data communication path for transferring data among the CPUs 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology. The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

Although the memory bus 103 is shown in FIG. 1 as a relatively simple, single bus structure providing a direct communication path among the CPUs 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more CPUs 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
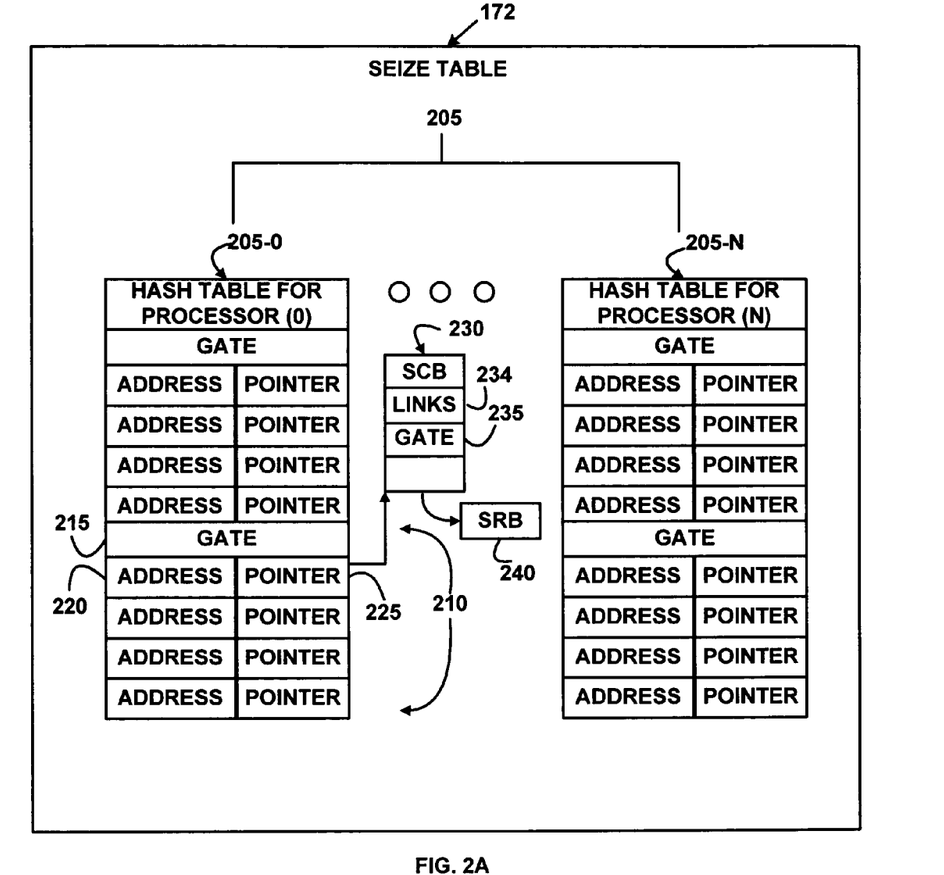
FIG. 2A depicts a block diagram of example data structures, according to an embodiment of the invention.

FIG. 2A depicts a block diagram of an example data structure for the seize table 172, according to an embodiment of the invention. The seize table 172 includes any number of hash tables 205-0 through 205-n, generically referred to herein as the hash table 205. Each of the hash tables 205 corresponds to and is associated with one of the respective processors 101. Each hash table 205 includes any number of hash class entries 210, each of which includes a gate 215, any number of addresses 220 and pointers 225 associated with the respective addresses 220. The addresses 220 include unique addresses within the memory 102. The pointer 225 points to a seize control block (SCB) 230, which represents the current seize. The seize control block 230 may include a links field 234, a gate 235, and a pointer to a seize record block 240. In an embodiment, the seize control block 230 includes one gate 235, which indicates a seize of the address 220 associated with the respective seize control block 230, and all other seizes overflow to the seize record block 240.

Although FIG. 2A only illustrates the hash class entry 210 in the hash table 205-0 as having an associated seize control block 230 and an associated seize record block 240, in other embodiments any of the hash class entries in any of the hash tables 205 may have respective seize control blocks and seize record blocks. Further, as used herein, hash class entry 210, gate 215, address 220, pointer 225, seize control block 230, gate 235, and seize record block 240 refer generically to elements associated with any of the hash tables 205.

Figure 2B:
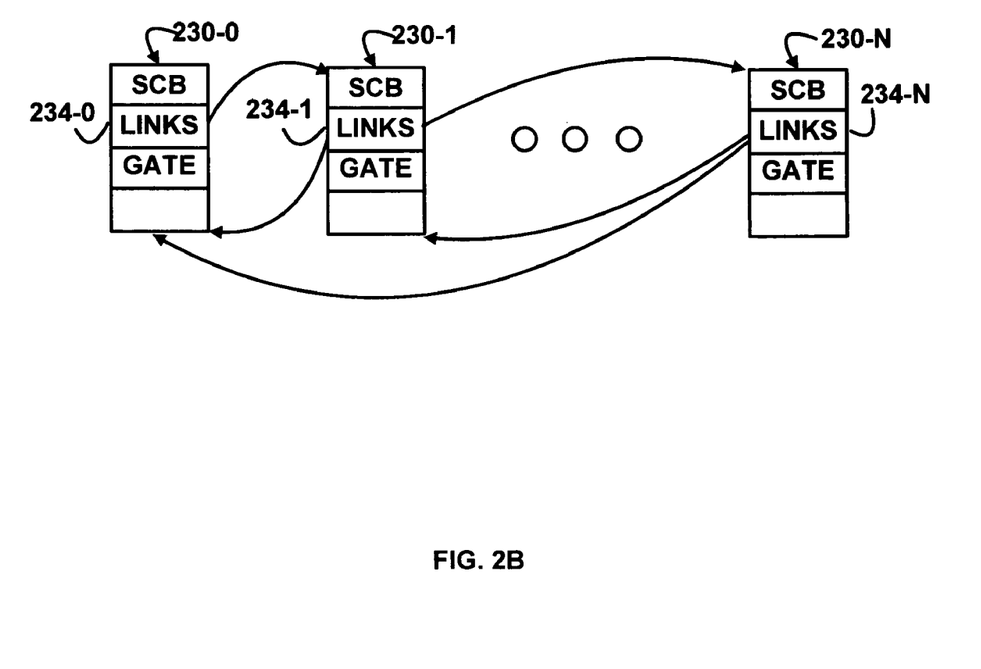
FIG. 2B depicts a block diagram of example data structures for linked seize control blocks, according to an embodiment of the invention.

FIG. 2B depicts a block diagram of example data structures for linked seize control blocks 230-0, 230-1, and 230-n, according to an embodiment of the invention, which were generically referred to in FIG. 2A as the seize control block 230. The seize control blocks 230-0, 230-1, and 230-n are associated with addresses in the hash tables 205 for processors (0), (1), and (n), respectively. In an embodiment, the links fields 234-0, 234-1, and 234-n include forward and/or backward points to the next and previous seize control block in the linked list. In an embodiment, the links fields 234-0, 234-1, and 234-n may also include a pointer to the seize control block 230-0 associated with processor (0).

Processor 0 may be any of the processors 101, where, in an embodiment, the processors are numbered for convenience from 0 to n, where n is any number. The linked list of control blocks 234-0, 234-1, and 234-n represent all seizes on a particular address 220 (FIG. 2A), so fast access is needed to access the gates 235 (FIG. 2A), which the links 234 provide.

Figure 3:
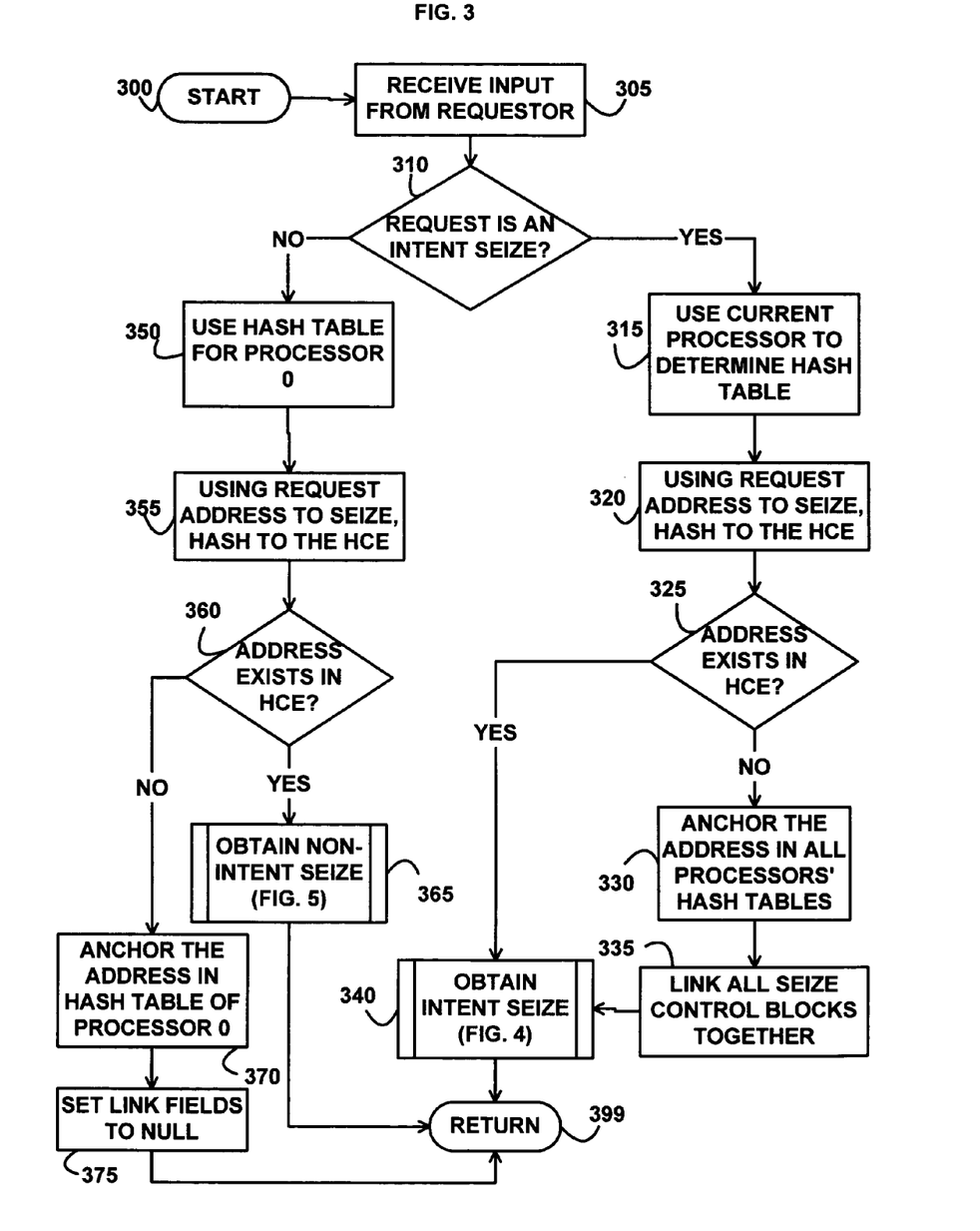
FIG. 3 depicts a flowchart of example processing for a seize mechanism, according to an embodiment of the invention.

FIG. 3 depicts a flowchart of example processing for the seize mechanism 170, according to an embodiment of the invention. Control begins at block 300. Control then continues to block 305 where the seize mechanism 170 receives input from the requestor of a seize of an address in the memory 102. In various embodiments, the requestor may be a task, job, process, or method executing on one of the processors 101. The input from the requester includes a requested address to seize in the memory 102, the current processor on which the requester is executing, and the type of seize (intent seize or non-intent seize) to perform on the requested address.

Control then continues to block 310 where the seize mechanism 170 determines whether the requestor requested an intent seize. If the determination at block 310 is true, then the requestor requested an intent seize, so control continues from block 310 to block 315 where the seize mechanism 170 uses the current processor to determine which of the hash tables 205 to use. Control then continues to block 320 where the seize mechanism 170, using the requested address to seize, hashes to the hash class entry (HCE) 210 in the hash table 205 that is associated with the current processor.

Control then continues to block 325 where the seize mechanism 170 determines whether the requested address exists in the hash class entry 210 that was previously determined at block 320, e.g., whether the requested address matches one of the addresses 220. If the determination at block 325 is true, then the requested address exists in the determined hash class entry 210, so control continues to block 340 where the seize mechanism 170 obtains an intent seize, as further described below with reference to FIG. 4. Control then continues to block 399 where the logic of FIG. 3 returns.

If the determination at block 325 is false, then the requested address does not exist in the hash class entry 210, so control continues to block 330 where the seize mechanism 170 establishes (anchors) the requested address in all of the hash tables 205 (205-0 through 205-n) associated with each of the respective processors 101, hashing to each hash class entry 210 for the requested address. Control then continues to block 335 where the seize mechanism 170 links all of the seize control blocks (SCB) 230 together via the links field 234. Control then continues to block 340, as previously described above.

If the determination at block 310 is false, then the requestor requested a non-intent seize, so control continues from block 310 to block 350 where the seize mechanism 170 uses the hash table 205-0 associated with the processor (0). The use of processor (0) is arbitrary, and in other embodiments any designated one of the processors 101 may be used for all of the non-intent seizes, regardless of whether the designated processor requested the non-intent seize.

Control then continues to block 355 where the seize mechanism 170 hashes to the hash class entry 210 in the hash table 205-0 associated with the processor (0) using the requested address to seize. Control then continues to block 360 where the seize mechanism 170 determines whether the requested address exists in the hash class entry 210. If the determination at block 360 is true, then the requested address does exist in the hash class entry 210, so control continues from block 360 to block 365 where the seize mechanism 170 obtains a non-intent seize, as further described below with reference to FIG. 5. Control then continues to block 399 where the logic of FIG. 3 returns.

If the determination at block 360 is false, then the requested address does not exist in the hash class entry 210, so control continues from block 360 to block 370 where the seize mechanism 170 establishes (anchors) the requested address in the hash table 205-0, which is associated with the processor (0), hashing to the hash class entry 210 for the requested address. Control then continues to block 375 where the seize mechanism 170 sets the link fields 234 in the seize control block 230 to null since the link fields 234 are only set to point to forward, backward, and/or processor (0) seize control blocks if the address 220 has an intent seize request directed to it. Control then continues to block 399 where the logic of FIG. 3 returns.

Figure 4:
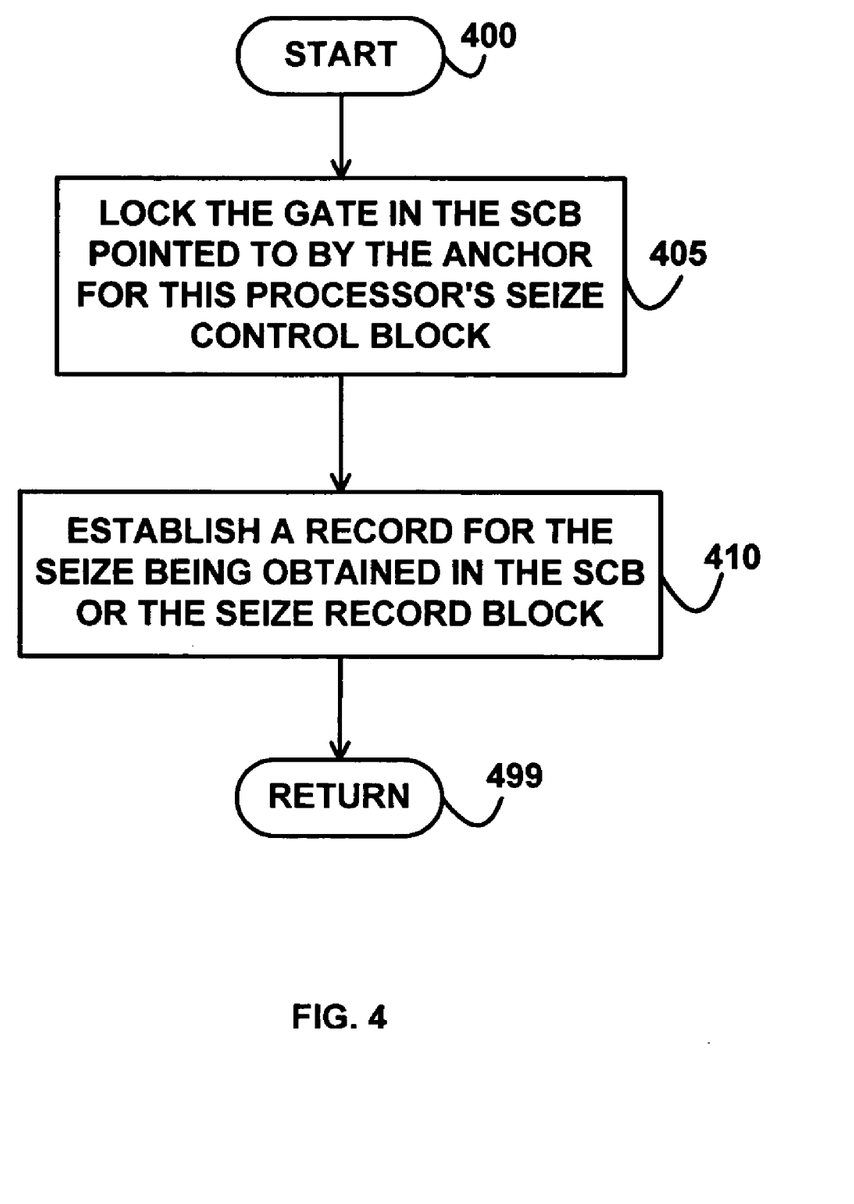
FIG. 4 depicts a flowchart of example processing for an intent seize function in the seize mechanism, according to an embodiment of the invention.

FIG. 4 depicts a flowchart of example processing for an intent seize function in the seize mechanism 170, according to an embodiment of the invention. Control begins at block 400. Control then continues to block 405 where the seize mechanism 170 locks the gate 235 in the seize control block 230, which is pointed to by the pointer 225 associated with the anchor address for the current processor's hash table 205. Control then continues to block 410 where the seize mechanism 170 establishes a record for the seize being obtained in the seize control block 230 or the seize record block 240. In an embodiment, the seize control block 230 contains only one seize record, and all other seize records overflow to the seize record blocks 240. Control then continues to block 499 where the logic of FIG. 4 returns.

Figure 5:
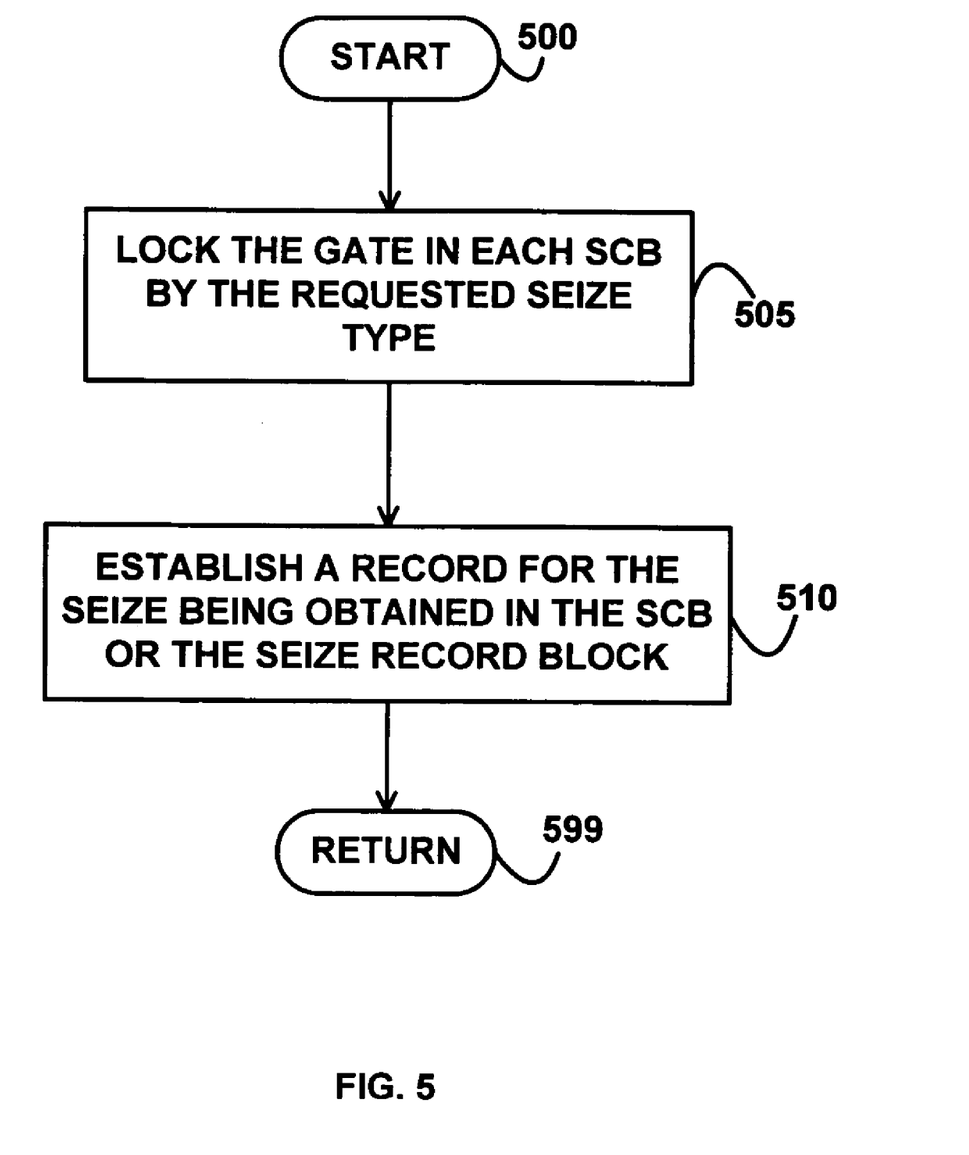
FIG. 5 depicts a flowchart of example processing for a non-intent seize function in the seize mechanism, according to an embodiment of the invention.

FIG. 5 depicts a flowchart of example processing for a non-intent seize function in the seize mechanism 170, according to an embodiment of the invention. Control begins at block 500. Control then continues to block 505 where the seize mechanism 170 locks the gate 235 in each seize control block 230, following the links 234 pointed to by the requested seize type via the pointer 225, in order to block any conflicting concurrent requests in all hash tables 205 for this address 220.

Control then continues to block 510 where the seize mechanism 170 establishes a record for the seize being obtained in the seize control block 230 or the seize record block 240. In an embodiment, only one seize record exists in the seize control block 230, and all other seize records overflow to the seize record block 240. Control then continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   if a seize request for an address is an intent seize, finding a first hash table from among a plurality of hash tables, wherein the first hash table is associated with a first processor of a plurality of processors, wherein the first processor initiated the seize request, and wherein each of the plurality of hash tables is associated with a respective one of the plurality of processors;
   determining whether the address exists in the first hash table;
   if the address exists in the first hash table and the seize request is for the intent seize, obtaining the intent seize via a resource associated with the first processor; and
   if the seize request for the address is a non-intent seize, finding a second hash table associated with a second processor of the plurality of processors, wherein the second hash table is designated for all non-intent seizes, regardless of whether the second processor initiated the seize request.

2. The method of claim 1, further comprising:
   if the address does not exist in the first hash table, anchoring the address in the plurality of hash tables associated with the plurality of processors.

3. The method of claim 1, further comprising:
   if the address does not exist in the first hash table, linking together a plurality of resources associated with the plurality of processors.

4. The method of claim 1, further comprising:
   anchoring the address in the second hash table if the seize request is for the non-intent seize.

5. An apparatus comprising:
   means for determining whether a seize request for an address is an intent seize;
   means for determining a first hash table from among a plurality of hash tables based on a first processor of a plurality of processors, wherein the first processor initiated the seize request if the seize request is for the intent seize, and wherein each of the plurality of hash tables is associated with a respective one of the plurality of processors;
   means for determining whether the address exists in a hash class entry in the first hash table;
   means for obtaining the intent seize via a seize control block associated with the first processor if the address exists in the hash class entry and the seize request is for the intent seize; and
   means for finding a second hash table associated with a second processor of the plurality of processors, wherein the second hash table is designated for all non-intent seizes, regardless of whether the second processor initiated the seize request.

6. The apparatus of claim 5, further comprising:
   means for anchoring the address in the plurality of hash tables associated with the plurality of processors if the address does not exist in the hash class entry in the first hash table.

7. The apparatus of claim 5, further comprising:
   means for linking together a plurality of seize control blocks associated with the plurality of processors if the address does not exist in the hash class entry in the first hash table.

8. The apparatus of claim 5, further comprising:
   means for anchoring the address in the second hash table if the seize request is for the non-intent seize.

9. A storage medium encoded with instructions, wherein the instructions when executed comprise:
   if a seize request for an address is an intent seize, finding a first hash table from among a plurality of hash tables, wherein the first hash table is associated with a first processor of a plurality of processors, wherein the first processor initiated the seize request, and wherein each of the plurality of hash tables is associated with a respective one of the plurality of processors;
   determining whether the address exists in the first hash table;
   if the address exists in the first hash table and the seize request is for the intent seize, obtaining the intent seize via a seize control block associated with the first processor;
   if the address does not exist in the first hash table and the seize request is for the intent seize, anchoring the address in the plurality of hash tables associated with the plurality of processors; and
   if the seize request for the address is a non-intent seize, finding a second hash table associated with a second processor of the plurality of processors, wherein the second hash table is designated for all non-intent seizes, regardless of whether the second processor initiated the seize request.

10. The storage medium of claim 9, further comprising:
    if the address does not exist in the first hash table, linking together a plurality of seize control blocks associated with the plurality of processors.

11. The storage medium of claim 9, further comprising:
    anchoring the address in the second hash table if the seize request is for the non-intent seize.

12. The storage medium of claim 9, wherein the intent seize is a less restrictive lock on memory than the non-intent seize.

13. A computer system comprising:
    a plurality of processors; and
    a main memory encoded with instructions, wherein the instructions when executed on at least one of the plurality of processors comprise:
      if a seize request for an address is an intent seize, finding a first hash table from among a plurality of hash tables, wherein the first hash table is associated with a first processor of the plurality of processors, wherein the first processor initiated the seize request, and wherein each of the plurality of hash tables is associated with a respective one of the plurality of processors,
      determining whether the address exists in the first hash table,
      if the address exists in the first hash table and the seize request is for the intent seize, obtaining the intent seize via a seize control block associated with the first processor,
      if the address does not exist in the first hash table and the seize request is for the intent seize, anchoring the address in the plurality of hash tables associated with the plurality of processors and linking together a plurality of seize control blocks associated with the plurality of processors, and
      if the seize request for the address is a non-intent seize, finding a second hash table associated with a second processor of the plurality of processors,
    wherein the second hash table is designated for all non-intent seizes, regardless of whether the second processor initiated the seize request.

14. The computer system of claim 13, wherein the instructions further comprise:
   if the seize request is for the non-intent seize and the address exists in the second hash table, anchoring the address in the second hash table.

15. The computer system of claim 13, wherein the instructions further comprise:
   if the seize request is for the non-intent seize and the address does not exist in the second hash table, obtaining the non-intent seize, wherein the obtaining further comprises locking a gate in each of the plurality of the seize control blocks associated with each of the plurality of processors.

16. The computer system of claim 13, wherein the intent seize is a less restrictive lock on memory than the non-intent seize.

* * * * *